US012698791B2

(12) United States Patent
Lin et al.

(10) Patent No.: US 12,698,791 B2
(45) Date of Patent: Aug. 4, 2026

(54) CUSHIONING MEMBER AND DETACHABLE DEVICE

(71) Applicant: Coretronic Corporation, Hsin-Chu (TW)

(72) Inventors: Wei-Ping Lin, Hsin-Chu (TW); Chao-Kuan Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 92 days.

(21) Appl. No.: 17/852,370

(22) Filed: Jun. 29, 2022

(65) Prior Publication Data

US 2023/0003244 A1 Jan. 5, 2023

(30) Foreign Application Priority Data

Jun. 30, 2021 (CN) .......................... 202121463681.7

(51) Int. Cl.
| | |
|---|---|
| *F16B 21/08* | (2006.01) |
| *F16B 19/00* | (2006.01) |
| *F16B 21/12* | (2006.01) |
| *H04R 1/02* | (2006.01) |

(52) U.S. Cl.
CPC .......... *F16B 21/125* (2013.01); *F16B 19/004* (2013.01); *F16B 21/082* (2013.01); *H04R 1/025* (2013.01)

(58) Field of Classification Search
CPC ...... F16B 21/082; F16B 21/086; F16F 1/3732
USPC ........................................................ 411/508
See application file for complete search history.

(56) References Cited

U.S. PATENT DOCUMENTS

| | | | | | |
|---|---|---|---|---|---|
| 2,368,200 | A | * | 1/1945 | Cavanagh .............. | B62D 25/18 428/31 |
| 3,319,918 | A | * | 5/1967 | Rapata .................. | F16B 37/043 267/141 |
| 3,902,215 | A | * | 9/1975 | Waldrop ................ | E21B 33/08 411/509 |
| 4,159,592 | A | * | 7/1979 | Gabriel ................ | A63H 33/101 446/124 |
| 4,454,699 | A | * | 6/1984 | Strobl .................. | F16B 21/082 411/510 |
| 5,316,423 | A | * | 5/1994 | Kin ........................ | G10K 11/16 411/510 |
| 5,685,682 | A | * | 11/1997 | Glime .................. | F16B 21/082 411/510 |

(Continued)

FOREIGN PATENT DOCUMENTS

| | | |
|---|---|---|
| CN | 101629586 | 1/2010 |
| TW | I327624 | 7/2010 |

*Primary Examiner* — Flemming Saether
(74) *Attorney, Agent, or Firm* — JCIPRNET

(57) ABSTRACT

A cushioning member includes a support portion, a first latch portion, a second latch portion, a first connection portion, a second connection portion, a first guide portion and a second guide portion. The first guide portion, the first latch portion, and the first connection portion are arranged opposite to the second connection portion, the second latch portion and the second guide portion on basis of the support portion as a center. When the first and second latch portions are in a relaxed state, a width of the support portion in a direction perpendicular to the axial direction is greater than a width of the first latch portion and a width of the second latch portion in the direction.

17 Claims, 7 Drawing Sheets

(56)                    References Cited

U.S. PATENT DOCUMENTS

| | | | |
|---|---|---|---|
| 5,704,254 A * | 1/1998 | Thomas | B62D 1/16 |
| | | | 411/509 |
| 6,442,806 B1 * | 9/2002 | Wesson | F16B 2/06 |
| | | | 24/17 AP |
| 7,384,210 B2 * | 6/2008 | Sura | F16B 21/082 |
| | | | 411/510 |
| 8,075,250 B2 * | 12/2011 | Zhou | F04D 29/64 |
| | | | 24/453 |
| 8,934,247 B2 * | 1/2015 | Chen | H01L 23/40 |
| | | | 361/688 |
| 9,850,929 B2 * | 12/2017 | Gonnet | B60J 1/005 |
| 10,701,467 B2 * | 6/2020 | Kumakura | F16B 21/086 |
| 2009/0019674 A1 * | 1/2009 | Sato | F16B 21/09 |
| | | | 24/289 |

* cited by examiner

CUSHIONING MEMBER AND DETACHABLE DEVICE

CROSS-REFERENCE TO RELATED APPLICATION

This application claims the priority benefit of China application serial no. 202121463681.7, filed on Jun. 30, 2021. The entirety of the above-mentioned patent application is hereby incorporated by reference herein and made a part of this specification.

BACKGROUND

Technical Field

The invention relates to a buckle structure and a device adopting such buckle structure, and particularly relates to a cushioning member with buckling and cushioning functions and a detachable device using the cushioning member.

Description of Related Art

Generally, most projection devices or other electronic devices use screws together with silicone or rubber to lock a speaker on a speaker base locking point for fixing. Since the speaker has a large amount of vibration, the silicone or rubber is used for cushioning to achieve a shock-absorbing effect. One speaker cabinet at least needs three to four screws for locking and fixation, and one device usually has two speaker cabinets. Therefore, if a locking means of screw is used, in addition to a time-consuming locking process, in order to avoid mistakes of not locking tight, an additional dispensing procedure is further required, which is very time-consuming and labor-intensive. In addition, the screws that match the existing silicone or rubber need to be specially made, and commonly used screws cannot be used for locking. Therefore, the cost is increased and further design is required.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a cushioning member, which has buckling and cushioning effects.

The invention is directed to a detachable device, which adopts the above cushioning member to detachably fix a first part and a second part together without using additional locking elements and locking actions.

Other objects and advantages of the invention may be further illustrated by the technical features broadly embodied and described as follows.

In order to achieve one or a portion of or all of the objects or other objects, an embodiment of the invention provides a cushioning member including a support portion, a first latch portion, a second latch portion, a first connection portion, a second connection portion, a first guide portion and a second guide portion. The first guide portion, the first latch portion, the first connection portion, the support portion, the second connection portion, the second latch portion, and the second guide portion are sequentially connected together along an axial direction. The cushioning member is made of a compressible material, and the first guide portion, the first latch portion, and the first connection portion are arranged opposite to the second connection portion, the second latch portion and the second guide portion on basis of the support portion as a center. When the first latch portion and the second latch portion are in a relaxed state, a width of the support portion in a direction perpendicular to the axial direction is greater than a width of the first latch portion and a width of the second latch portion in the direction. A width of the first guide portion in the direction is smaller than the width of the first latch portion. A width of the second guide portion in the direction is smaller than the width of the second latch portion.

In order to achieve one or a portion of or all of the objects or other objects, an embodiment of the invention provides a detachable device including a first part, a second part, and at least one cushioning member, wherein the first part and the second part are detachably fixed together through the at least one cushioning member. The cushioning member includes a support portion, a first latch portion, a second latch portion, a first connection portion, a second connection portion, a first guide portion and a second guide portion. The first guide portion, the first latch portion, the first connection portion, the support portion, the second connection portion, the second latch portion, and the second guide portion are sequentially connected together along an axial direction. The cushioning member is made of a compressible material, and the first guide portion, the first latch portion, and the first connection portion are arranged opposite to the second connection portion, the second latch portion and the second guide portion on basis of the support portion as a center. When the first latch portion and the second latch portion are in a relaxed state, a width of the support portion in a direction perpendicular to the axial direction is greater than a width of the first latch portion and a width of the second latch portion in the direction. A width of the first guide portion in the direction is smaller than the width of the first latch portion. A width of the second guide portion in the direction is smaller than the width of the second latch portion.

Based on the above description, the embodiments of the invention have at least one of the following advantages or effects. In the cushioning member of the invention, the cushioning member is made of a compressible material, and is composed of the support portion, two latch portions, two connection portions, and two guide portions, where in the direction perpendicular to the axial direction, the width of the support portion is greater than the width of the latch portion, and the width of the guide portion is smaller than the width of the latch portion. According to such design, in addition to the cushioning function, the cushioning member also has the buckling function, and may be buckled between the first part and the second part of the detachable device to maintain and fix the connection relationship between the first part and the second part without using additional locking elements and locking actions.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
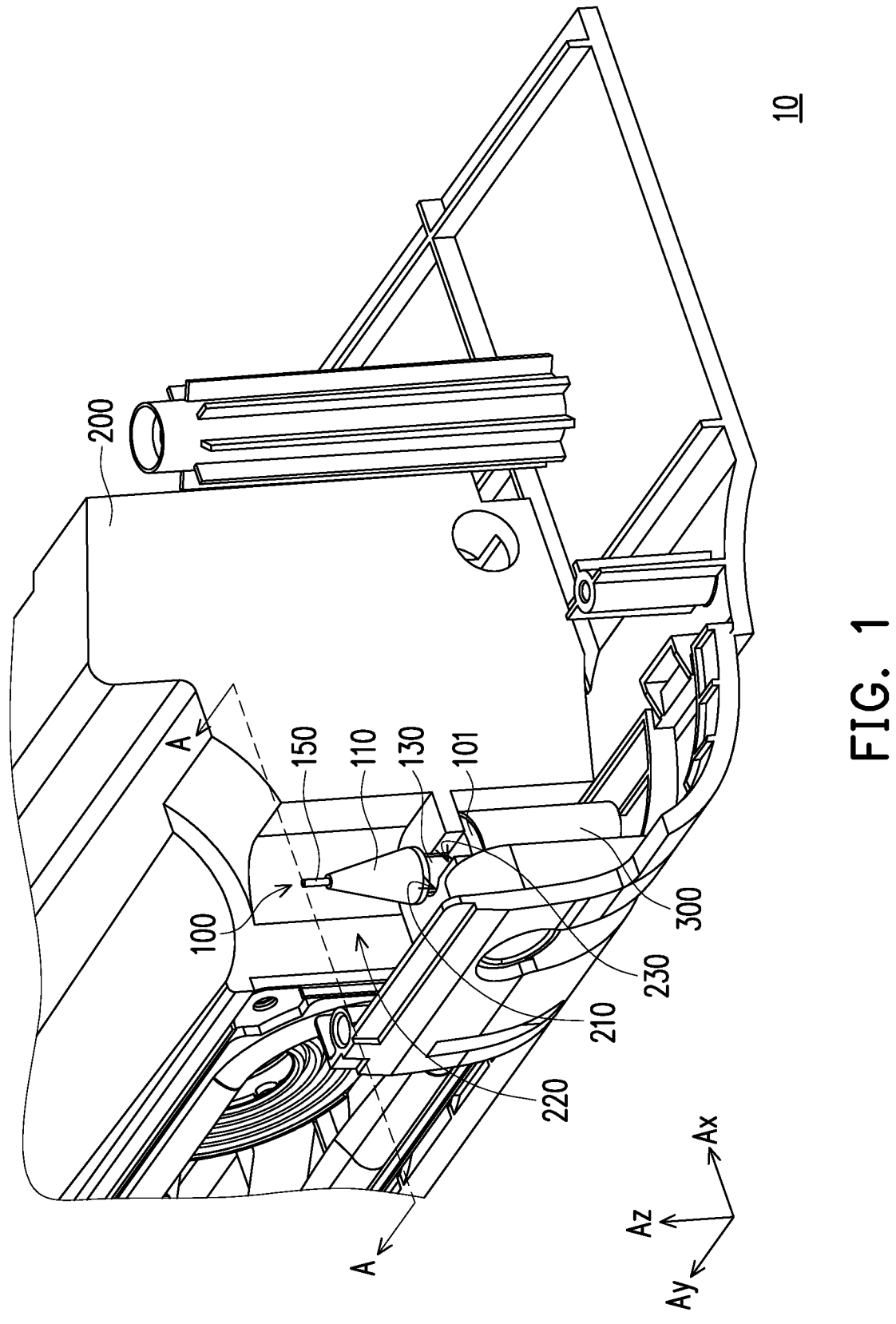

FIG. 1 is a partial three-dimensional view of a detachable device according to an embodiment of the invention.

Figure 2:
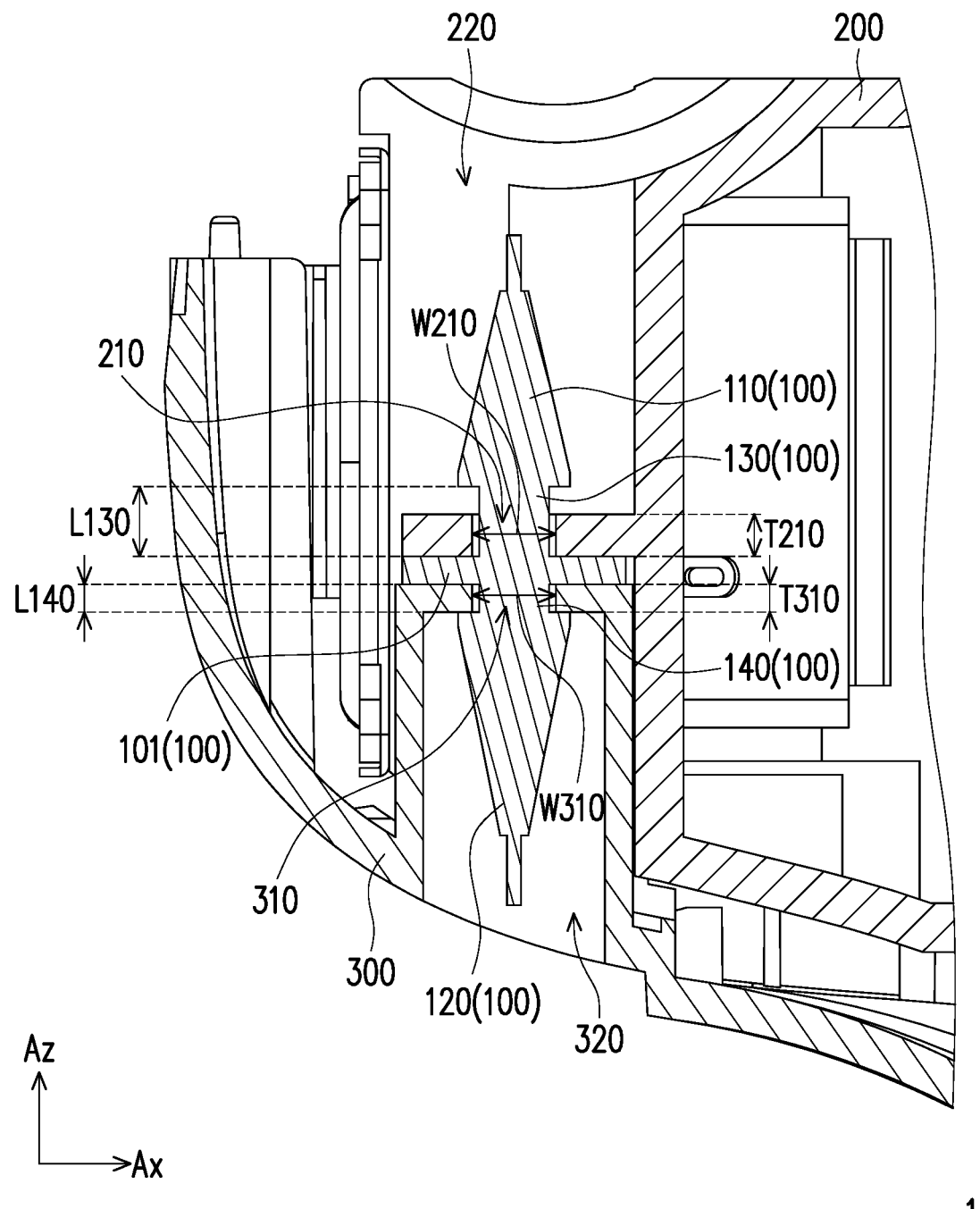

FIG. 2 is a schematic cross-sectional view of FIG. 1 viewing along a line A-A.

Figure 3:
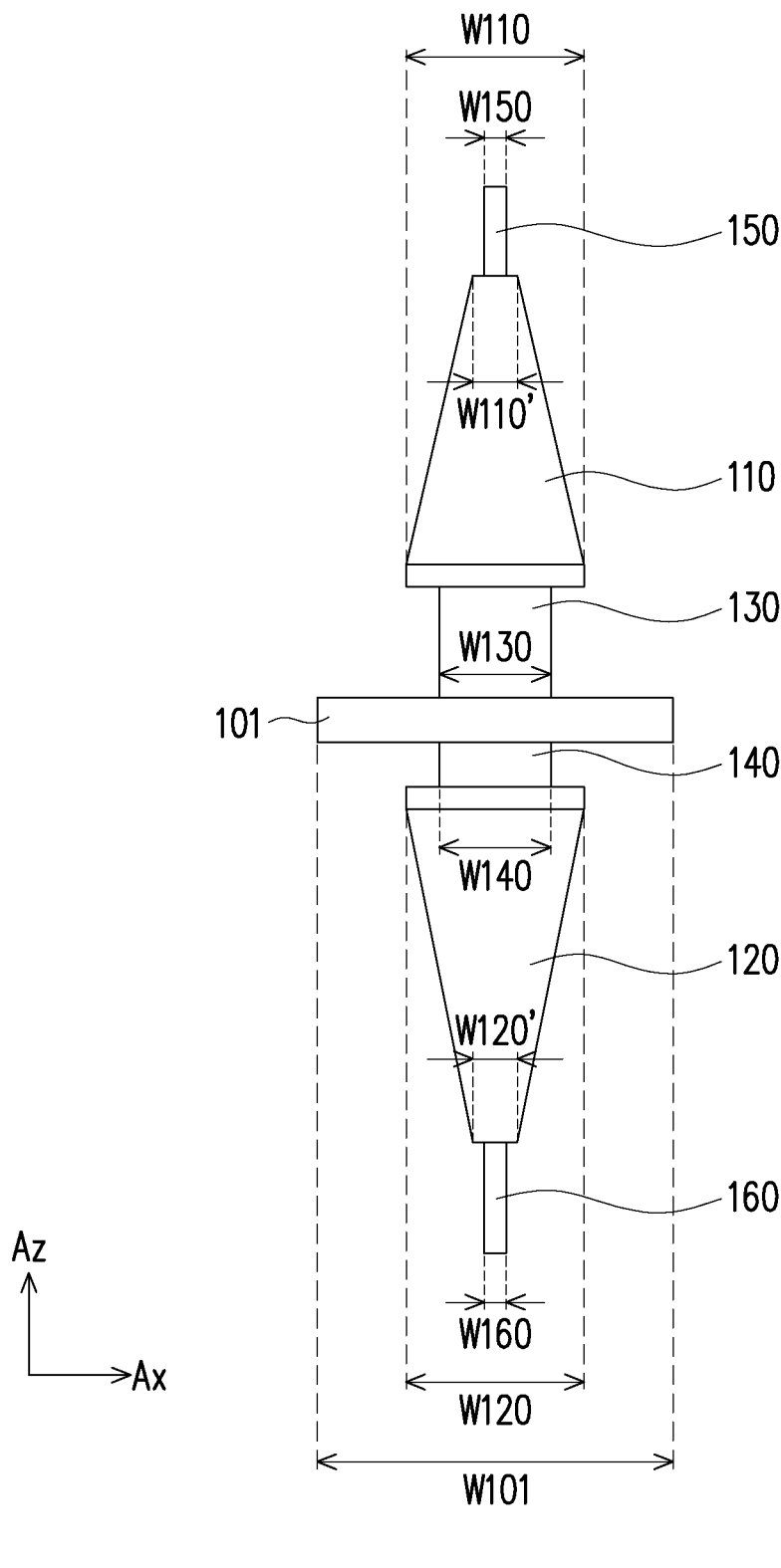

FIG. 3 is a schematic side view of a cushioning member of the detachable device of FIG. 1.

Figure 4A:
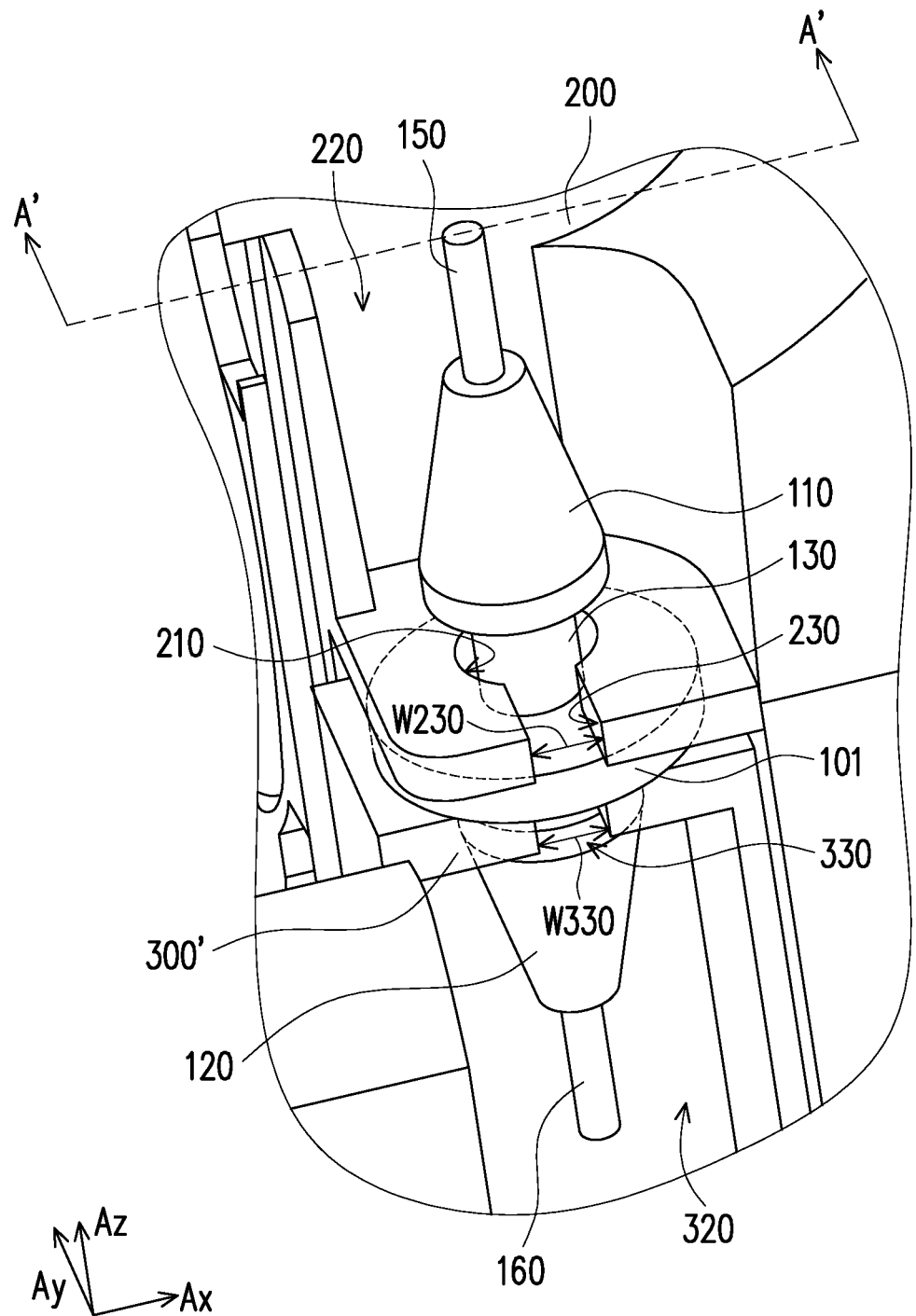

FIG. 4A is a partial three-dimensional view of a detachable device according to another embodiment of the invention.

Figure 4B:
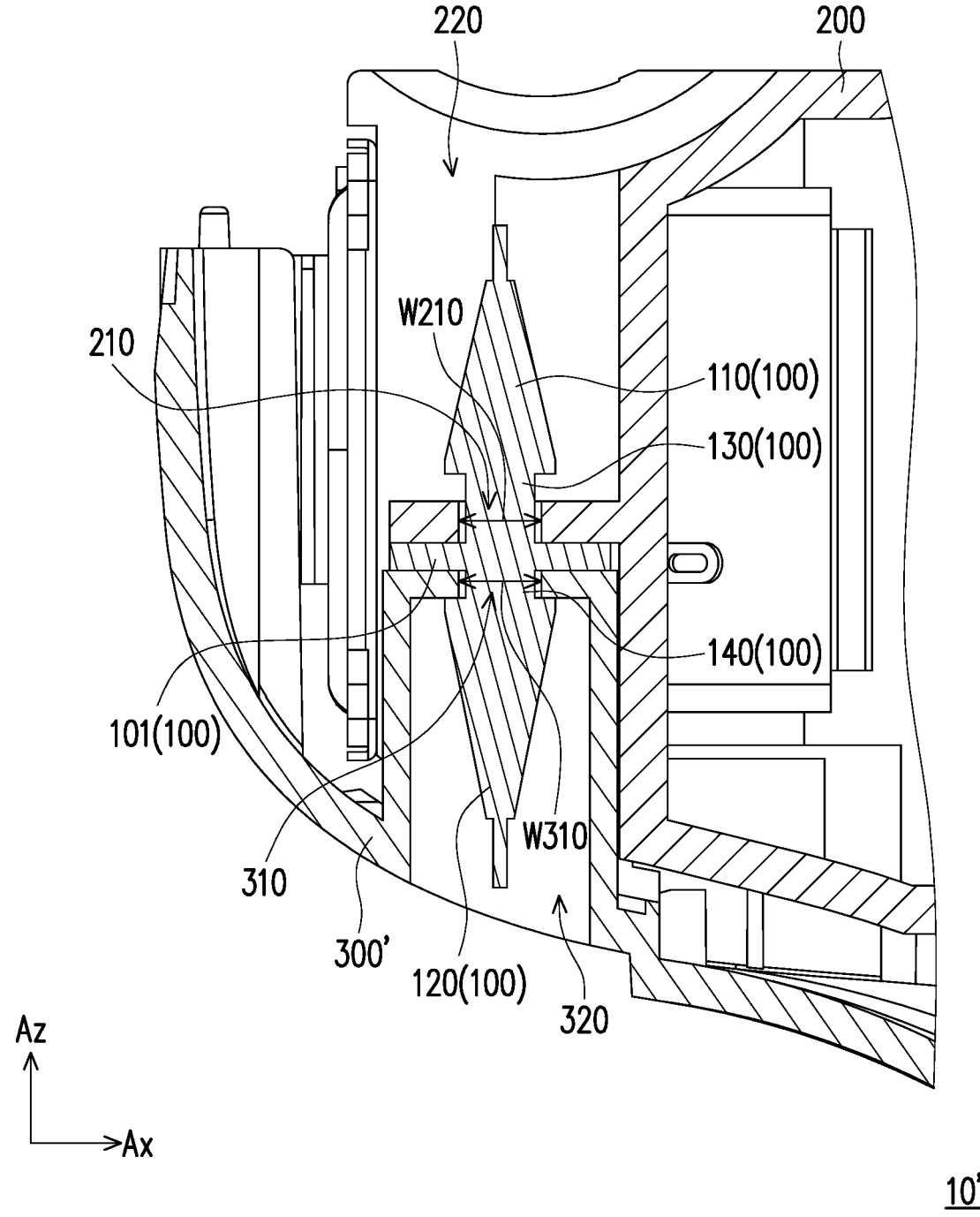

FIG. 4B is a schematic cross-sectional view of FIG. 4A viewing along a line A'-A'.

FIG. 5A to FIG. 5D are schematic side views of a plurality of cushioning members according to a plurality of embodiments of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

FIG. 1 is a partial three-dimensional view of a detachable device according to an embodiment of the invention. FIG. 2 is a schematic cross-sectional view of FIG. 1 viewing along a line A-A. FIG. 3 is a schematic side view of a cushioning member of the detachable device of FIG. 1. FIG. 4A is a partial three-dimensional view of a detachable device according to another embodiment of the invention. FIG. 4B is a schematic cross-sectional view of FIG. 4A viewing along a line A'-A'.

First, referring to FIG. 1 and FIG. 2 at the same time, in the embodiment, the detachable device 10 includes a first part 200, a second part 300, and at least one cushioning member 100, where the first part 200 and the second part 300 are adapted to be detachably fixed together through the cushioning member 100, i.e., the first part 200 and the second part 300 are assembled together by using the cushioning member 100 and disassembled apart by removing the cushioning member 100. In the embodiment, the first part 200 is, for example, a speaker, and the second part 300 is, for example, a projector base, but the invention is not limited thereto. In particular, the cushioning member 100 of the embodiment is, for example, all made of a compressible material, so that it may be configured between the first part 200 and the second part 300 and lean against the first part 200 and the second part 300 to achieve buckling and cushioning effects, thereby effectively reduce an abnormal sound generated by vibration of the speaker. The compressible material of the cushioning member 100 is, for example, rubber or silicone, but the embodiment is not limited thereto, and the compressible material is applicable as long as it is an elastic material that may withstand high temperatures. It should be noted that the cushioning member 100 presents a relaxed state when no force is applied, and the cushioning member 100 presents a compressed state when a force is applied, where the drawings of the invention all illustrate the relaxed state.

In detail, referring to FIG. 2 and FIG. 3 at the same time, the cushioning member 100 of the embodiment includes a support portion 101, a first latch portion 110, a second latch portion 120, a first connection portion 130, a second connection portion 140, a first guide portion 150, and a second guide portion 160. The first guide portion 150, the first latch portion 110, the first connection portion 130, the support portion 101, the second connection portion 140, the second latch portion 120, and the second guide portion 160 are sequentially connected together along an axial direction Az. Namely, the first guide portion 150, the first latch portion 110 and the first connection portion 130 are disposed opposite to the second connection portion 140, the second latch portion 120 and the second guide portion 160 while taking the support portion 101 as a center. In other words, the first guide portion 150, the first latch portion 110 and the first connection portion 130 are disposed opposite to the second connection portion 140, the second latch portion 120 and the second guide portion 160 on basis of the support portion 101 as a center. Preferably, the first guide portion 150, the first latch portion 110, the first connection portion 130, the support portion 101, the second connection portion 140, the second latch portion 120, and the second guide portion 160 are an integrally formed structure. In this way, when the cushioning member 100 is installed and fixed, it will not be disassembled or separated due to a pulling force to lose the fixing effect, so that it may have better structural reliability.

In the embodiment, when the first latch portion 110 and the second latch portion 120 are in the relaxed state, the first latch portion 110 and the second latch portion 120, for example, respectively have a tapered shape. In other words, a width W110 of the first latch portion 110 in a direction Ax perpendicular to the axial direction Az gradually decreases in a direction from an end of the first latch portion 110 connected with the first connection portion 130 toward the first guide portion 150. Similarly, a width W120 of the second latch portion 120 in the direction Ax gradually decreases in a direction from an end of the second latch portion 120 connected with the second connection portion 140 toward the second guide portion 160. A width W101 of the support portion 101 in the direction Ax perpendicular to the axial direction Az is greater than the width W110 of the first latch portion 110 in the direction Ax. And the width W101 of the support portion 101 in the direction Ax perpendicular to the axial direction Az is greater than the width W120 of the second latch portion 120 in the direction Ax.

In addition, a width W130 of the first connection portion 130 in the direction Ax is smaller than the width W110 of the end of the first latch portion 110 connected with the first connection portion 130, and a width W150 of the first guide portion 150 in the direction Ax is smaller than the width W110 of the other end of the first latch portion 110 connected with the first guide portion 150. In other words, the width W130 of the first connection portion 130 is smaller than the maximum width of the first latch portion 110, and the width W150 of the first guide portion 150 is smaller than the minimum width W110' of the first latch portion 110. Similarly, a width W140 of the second connection portion 140 in the direction Ax is smaller than the width W120 of the end of the second latch portion 120 connected with the second connection portion 140, and a width W160 of the second guide portion 160 in the direction Ax is smaller than the width W120 of the other end of the second latch portion 120 connected with the second guide portion 160. In other words, the width W140 of the second connection portion 140 is smaller than the maximum width of the second latch portion 120, and the width W160 of the second guide portion 160 is smaller than the minimum width W120' of the second latch portion 120.

As shown in FIG. 2 and FIG. 3, the width W101 of support portion 101 in the direction Ax perpendicular to the axial direction Az is greater than the width W130 of the first connection portion 130 in the direction Ax, the width W110 of the first latch portion 110, and the width W140 of the second connection portion 140 in the direction Ax and the width W120 of the second latch portion 120. In other words, the width W101 of the support portion 101 is the widest among all of the components of the cushioning member 100. Since the support portion 101 has elasticity, it may serve as a buffer between the first part 200 and the second part 300. Namely, a force generated by the first part 200 during vibration is attenuated when being transmitted through the support portion 101, so that an amount of vibration actually transmitted to the second part 300 is reduced, so as to avoid generating abnormal sound.

To be more specific, referring to FIG. 2 and FIG. 3 at the same time, in the embodiment, the first part 200 includes a first position-limiting channel 210, and the second part 300 includes a second position-limiting channel 310. Since the first position-limiting channel 210 and the second position-limiting channel 310 correspond to each other along the axial direction Az, the first connection portion 130 and the second connection portion 140 of the cushioning member 100 may respectively penetrate through the first position-limiting channel 210 and the second position-limiting channel 310. In this way, the support portion 101 of the cushioning member 100 abuts between the first part 200 and the second part 300, i.e., a surface of the support portion 101 facing the first buckling portion 110 and a surface thereof facing the second buckling portion 120 respectively leans against the first part 200 and the second part 300. Moreover, the first part 200 of the embodiment further includes a first accommodating cavity 220, and the second part 300 further includes a second accommodating cavity 320. The first accommodating cavity 220 communicates with the first position-limiting channel 210 in the axial direction Az to accommodate the first latch portion 110 in the relaxed state. The second accommodating cavity 320 communicates with the second position-limiting channel 310 in the axial direction Az to accommodate the second latch portion 120 in the relaxed state. In addition, referring to FIG. 1 again, the first part 200 of the embodiment further includes a first disassembly channel 230, where the first position-limiting channel 210 communicates with the first disassembly channel 230 along a direction perpendicular to the axial direction Az. In the embodiment, the first position-limiting channel 210, for example, communicates with the first disassembly channel 230 along a direction Ay perpendicular to the axial direction Az.

Referring to FIG. 1, FIG. 2 and FIG. 3 again, when the first part 200 and the second part 300 are to be fixed together, a force must be first applied to the second latch portion 120 of the cushioning member 100 from top to bottom in the axial direction Az to compress the second latch portion 120, so that the second latch portion 120 passes through the second position-limiting channel 310 of the second part 300 in a compressed state and is restored to the relaxed state in the second accommodating cavity 320. At this time, the support portion 101 of the cushioning member 100 leans against the second part 300. Then, a force is applied to the first latch portion 110 of the cushioning member 100 from top to bottom in the axial direction Az to compress the first latch portion 110, so that the first latch portion 110 passes through the first position-limiting channel 210 of the first part 200 in the compressed state, and is restored to the relaxed state in the first accommodating cavity 220. In the compressed state, the width W110 of the first latch portion 110 in the direction Ax and the width W120 of the second latch portion 120 in the direction Ax are respectively less than or equal to a width W210 of the first position-limiting channel 210 and a width W310 of the second position-limiting channel 310. Therefore, the first latch portion 110 and the second latch portion 120 may respectively pass through the first position-limiting channel 210 and the second position-limiting channel 310. In other embodiments, it is also possible to first compress the first latch portion 110 of the cushioning member 100 from top to bottom in the axial direction Az, so that the first latch portion 110 passes through the first position-limiting channel 210 of the first part 200 in the compressed state, and then the second latch portion 120 is compressed from top to bottom in the axial direction Az, so that the second latch portion 120 passes through the second position-limiting channel 310 of the second part 300 in the compressed state.

When the first latch portion 110 and the second latch portion 120 respectively reach the first accommodating cavity 220 and the second accommodating cavity 320, since they are no longer affected by a compression force, the first latch portion 110 and the second latch portion 120 return to the relaxed state, and now the first connection portion 130 and the second connection portion 140 are respectively located in the first position-limiting channel 210 and the second position-limiting channel 310, and the support portion 101 is sandwiched between the first part 200 and the second part 300. A cavity size of the first accommodating cavity 220 and a cavity size of the second accommodating cavity 320 may be suitable to accommodate the first latch portion 110 and the second latch portion 120 in the relaxed state. When the first latch portion 110 and the second latch portion 120 are in the relaxed state, the width W110 of the first latch portion 110 and the width W120 of the second latch portion 120 are respectively larger than the width W210 of the first position-limiting channel 210 in the direction Ax perpendicular to the axial direction Az and the width W310 of the second position-limiting channel 310 in the direction Ax perpendicular to the axial direction Az. Namely, in the relaxed state, the first latch portion 110 and the second latch portion 120 cannot escape along an original path via the first position-limiting channel 210 and the second position-limiting channel 310, thereby achieving a buckling effect. Furthermore, even if the cushioning member 100 is pulled outwards, only the axial direction Az compression may be applied to the first latch portion 110 and the second latch portion 120, and the first latch portion 110 and the second latch portion 120 are unable to pass through the first position-limiting channel 210 and the second position-limiting channel. In other words, the cushioning member 100 of the embodiment may maintain the connection relationship between the second part 300 and the first part 200.

Furthermore, after the first latch portion 110 and the second latch portion 120 pass through the first position-limiting channel 210 and the second position-limiting channel 310, the first connection portion 130 and the second connection portion 140 are respectively retained in the first position-limiting channel 210 and the second position-limiting channel 310. Preferably, a length L130 of the first connection portion 130 in the axial direction Az is greater than or equal to a thickness T210 of the first position-limiting channel 210 in the axial direction Az, and a length L140 of the second connection portion 140 in the axial direction Az is equal to a thickness T310 of the second position-limiting channel 310 in the axial direction Az. In this way, the support portion 101, the first latch portion 110 in the first accommodating cavity 220 and the second latch portion 120 in the second accommodating cavity 320 are more closely attached to the first part 200 and the second part 300. Namely, a gap between the first latch portion 110 and the first part 200, a gap between the second latch portion 120 and the second part 300, and a gap between the support portion 101 and the first part 200 and the second part 300 are relatively small, which may further enhance the buckling effect.

Moreover, referring to FIG. 2 and FIG. 3 at the same time, the width W150 of the first guide portion 150 and the width W160 of the second guide portion 160 of the cushioning member 100 of the embodiment are respectively smaller than the width W110 of the first latch portion 110 (minimum width) and the width W120 (minimum width) of the second latch portion 120. Therefore, when the first latch portion 110 and the second latch portion 120 are forced and compressed to pass through the first position-limiting channel 210 and the second position-limiting channel 310, the first guide portion 150 and the second guide portion 160 may provide an alignment effect, such that the first latch portion 110 and the second latch portion 120 may be more easily and accurately compressed to pass through the first position-limiting channel 210 and the second position-limiting channel 310.

Referring to FIG. 3, FIG. 4A and FIG. 4B for a detachable device 10' of another embodiment, a second part 300' further includes a second disassembly channel 330, where the first disassembly channel 230 and the second disassembly channel 330 may be used as a path for moving the cushioning member 100 out of the first part 200 and the second part 300'. To be more specific, the first position-limiting channel 210 communicates with the first disassembly channel 230 along a direction perpendicular to the axial direction Az, and the width W210 of the first position-limiting channel 210 in the direction Ax is greater than a width W230 of the first disassembly channel 230 in the direction Ax. The second position-limiting channel 310 communicates with the second disassembly channel 330 along a direction perpendicular to the axial direction Az. In the embodiment, the second position-limiting channel 310, for example, communicates with the second disassembly channel 330 along the direction Ay perpendicular to the axial direction Az. In addition, the width W310 of the second position-limiting channel 310 in the direction Ax is greater than the width W330 of the second disassembly channel 330 in the direction Ax. Here, the first disassembly channel 230 of the first part 200 and the second disassembly channel 330 of the second part 300' correspond to each other and are located on the same side.

When the first connection portion 130 and the second connection portion 140 are in the relaxed state, the width W130 of the first connection portion 130 in the direction Ax and the width W140 of the second connection portion 140 in the direction Ax are respectively greater than the width W230 of the first disassembly channel 230 and the width W330 of the second disassembly channel 330. Therefore, the first connection portion 130 and the second connection portion 140 cannot pass through the first disassembly channel 230 and the second disassembly channel 330 and are retained in the first position-limiting channel 210 and the second position-limiting channel 310. On the other hand, when the first connection portion 130 and the second connection portion 140 of the cushioning member 100 are in the compressed state, the width W130 of the first connection portion 130 and the width W140 of the second connection portion 140 are respectively smaller than the width W230 of the first disassembly channel 230 and the width W330 of the second disassembly channel 330. Accordingly, the first connection portion 130 and the second connection portion 140 may be respectively moved out of the first position-limiting channel 210 and the second position-limiting channel 310 along the first disassembly channel 230 and the second disassembly channel 330 in the direction Ay. Since the first disassembly channel 230 of the first part 200 and the second disassembly channel 330 of the second part 300' are located on the same side, the user may remove the entire cushioning member 100 through the first disassembly channel 230 and the second disassembly channel 330, which is convenient to repair or replace the cushioning member 100, or repair or replace the first part 200/the second part 300'.

In brief, when the first part 200 and the second part 300' are to be fixed in an actual operation, the first latch portion 110 and the second latch portion 120 of the cushioning member 100 are compressed first, and any one of the compressed first latch portion 110 and the second latch portion 120 is first inserted into the first position-limiting channel 210 of the first part 200 or the second position-limiting channel 310 of the second part 300'. Then, when the first latch portion 110 or the second latch portion 120 reaches the first accommodating cavity 220 or the second accommodating cavity 320, and the first latch portion 110 or the second latch portion 120 present the relaxed state and is engaged to the first part 200 or the second part 300', the other one of the first latch portion 110 and the second latch portion 120 repeats the above operation to fix the first part 200 and the second part 300'. When the cushioning member 100 is to be removed, by compressing the first connection portion 130 penetrating through the first position-limiting channel 210 and the second connection portion 140 penetrating through the second position-limiting channel 310, the first connection portion 130 and the second connection portion 140 are respectively moved out of the first position-limiting channel 210 and the second position-limiting channel 310 along the first disassembly channel 230 and the second disassembly channel 330, so that the first part 200 and the second part 300' are detached.

Since the cushioning member 100 of the embodiment is made of a compressible material, and has the buckling and cushioning functions, the connection relationship between the first part 200 and the second part 300 or 300' may not be too tight to achieve a cushioning effect. Therefore, the detachable device 10 or 10' of the embodiment may maintain and fix the connection relationship between the first part 200 and the second part 300 or 300' through the cushioning member 100 buckled between the first part 200 and the second part 300 or 300' without requiring additional locking elements and locking actions It should be noticed that reference numbers of the components and a part of contents of the aforementioned embodiment are also used in the following embodiment, wherein the same reference numbers denote the same or like components, and descriptions of the same technical contents are omitted. The aforementioned embodiment may be referred for descriptions of the omitted parts, and detailed descriptions thereof are not repeated in the following embodiment.

FIG. 5A to FIG. 5D are schematic side views of a plurality of cushioning members according to a plurality of embodiments of the invention.

Figure 5B:
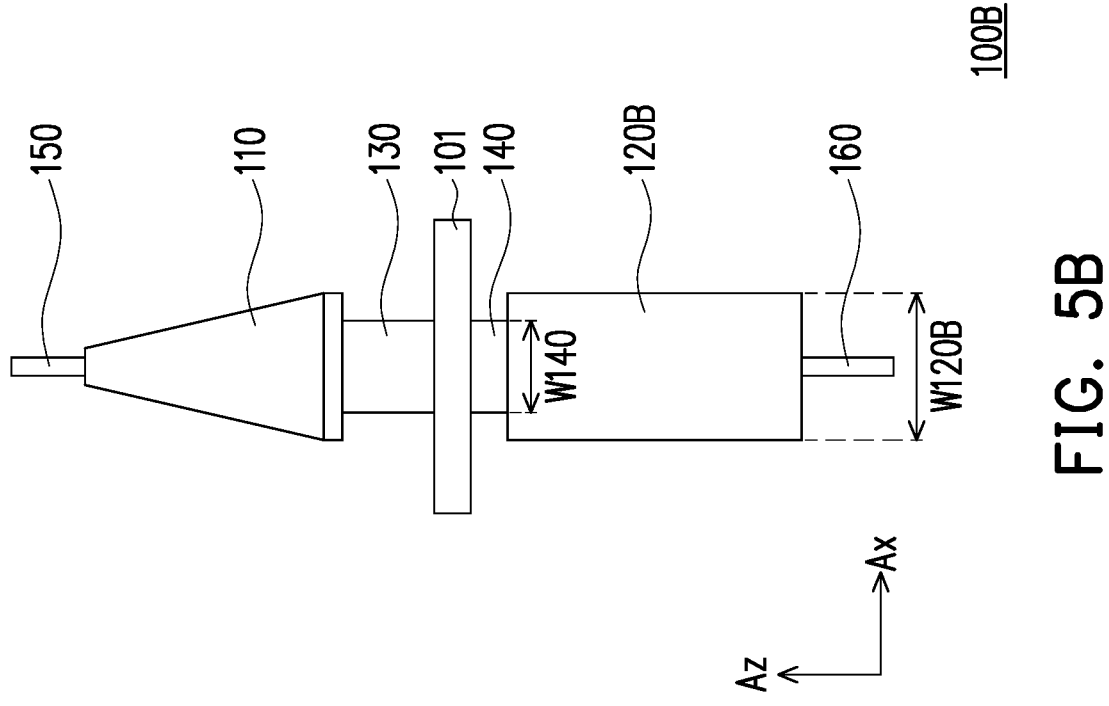
Figure 5A:
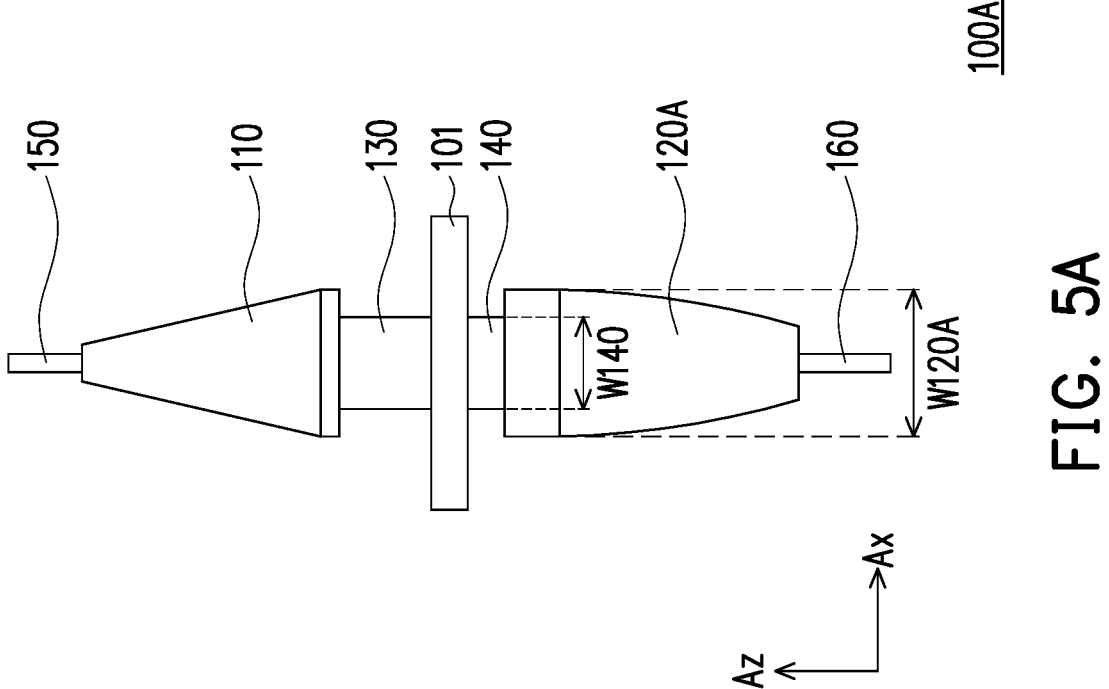

Referring to FIG. 3 and FIG. 5A at the same time, a cushioning member 100A of the embodiment is similar to the cushioning member 100 of FIG. 3, and a difference there between is that a shape of a second latch portion 120A of the cushioning member 100A is not a tapered shape, but is close to a bullet shape. Similarly, a width W120A of the second latch portion 120A in the direction Ax gradually decreases in a direction from an end of the second latch portion 120A connected with the second connection portion 140 toward the second guide portion 160.

Referring to FIG. 3 and FIG. 5B at the same time, a cushioning member 100B of the embodiment is similar to the cushioning member 100 of FIG. 3, and a difference there between is that a shape of a second latch portion 120B of the cushioning member 100B is not a tapered shape but is a columnar shape, which means that a width W120B of the second latch portion 120B in the direction Ax is a constant value. Namely, the width W120B of an end of the second latch portion 120B connected with the second connection portion 140 and the width W120B of the other end of the second latch portion 120B connected with the second guide portion 160 are the same.

Figure 5D:
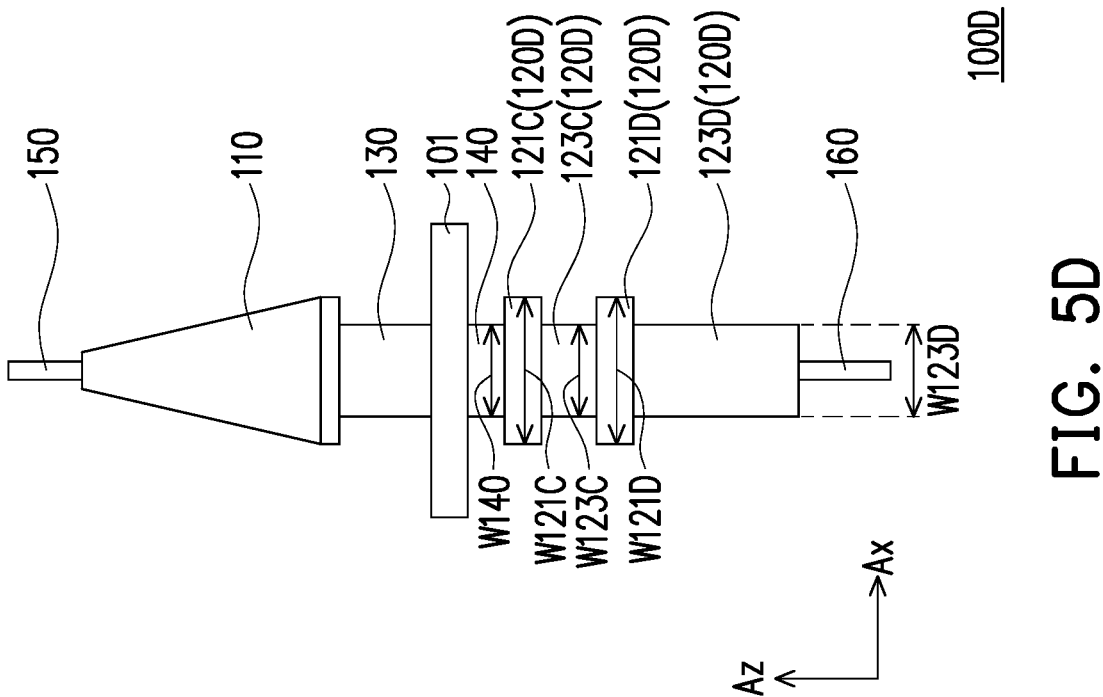
Figure 5C:
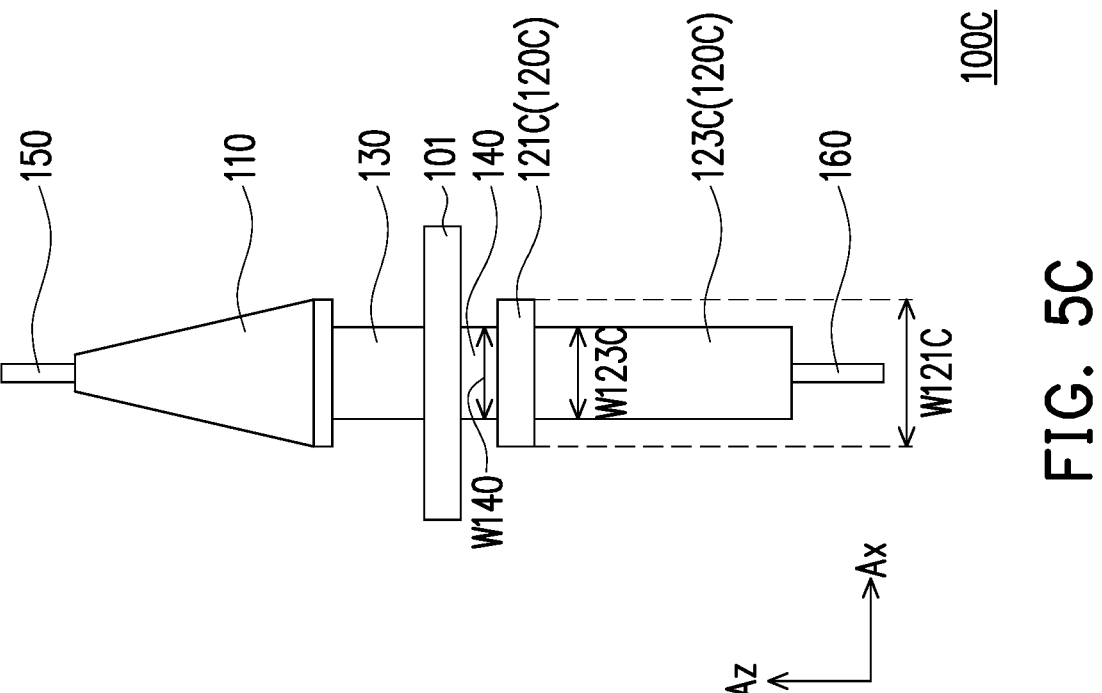

Referring to FIG. 3 and FIG. 5C at the same time, a cushioning member 100C of the embodiment is similar to the cushioning member 100 of FIG. 3, and a difference there between is that a second latch portion 120C of the cushioning member 100C has a first portion 121C and a second portion 123C. The first portion 121C of the second latch portion 120C is connected to the second connection portion 140 and the second portion 123C along the axial direction Az, and the second portion 123C is connected to the first portion 121C and the second guide portion 160 along the axial direction Az. The first portion 121C has a first width W121C in the direction Ax perpendicular to the axial direction Az, and the second portion 123C has a second width W123C in the direction Ax perpendicular to the axial direction Az, and the first width W121C is greater than the second width W123C. Here, the second latch portion 120C has, for example, a T shape.

Referring to FIG. 5C and FIG. 5D at the same time, a cushioning member 100D of the embodiment is similar to the cushioning member 100C of FIG. 5C, and a difference there between is that the second latch portion 120D of the cushioning member 100D further includes a third portion 121D and a fourth portion 123D. The third portion 121D is connected to the second portion 123C and the fourth portion 123D along the axial direction Az, and the fourth portion 123D is connected to the third portion 121D and the second guide portion 160 along the axial direction Az. The third portion 121D has a third width W121D in the direction Ax perpendicular to the axial direction Az, and the fourth portion 123D has a fourth width W123D in the direction Ax perpendicular to the axial direction Az. The first width W121C is equal to the third width W121D, the second width W123C is equal to the fourth width W123D, and the first width W121C and the third width W121D are greater than the second width W123C and the fourth width W123D. Here, the second latch portion 120D is, for example, two T shapes arranged in the axial direction. In the embodiments of FIG. 5B, FIG. 5C, and FIG. 5D, the second connection portion 140 of the cushioning member 100B, 100C, or 100D may first pass through the second disassembly channel of the second part in the compressed state for moving to the second position-limiting channel, and after the second latch portion 120B, 120C, or 120D is accommodated in the second accommodating cavity, the first latch portion 110 of the cushioning member 100B, 100C, or 100D is compressed to pass through the first position-limiting channel of the first part to enter the first accommodating cavity.

In summary, the embodiments of the invention have at least one of the following advantages or effects. In the cushioning member of the invention, the cushioning member is made of a compressible material, and is composed of the support portion, two latch portions, two connection portions, and two guide portions, where in the direction perpendicular to the axial direction, the width of the support portion is greater than the width of the latch portion, and the width of the guide portion is smaller than the width of the latch portion. According to such design, in addition to the cushioning function, the cushioning member also has the buckling function, and may be buckled between the first part and the second part of the detachable device to maintain and fix the connection relationship between the first part and the second part without using additional locking elements, cushioning elements and locking actions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims

What is claimed is:

1. A cushioning member, comprising a support portion, a first latch portion, a second latch portion, a first connection portion, a second connection portion, a first guide portion, and a second guide portion, wherein:

the first guide portion, the first latch portion, the first connection portion, the support portion, the second connection portion, the second latch portion, and the second guide portion are sequentially connected together along an axial direction;

the cushioning member is a solid member made by compressible material, and the first guide portion, the first latch portion, and the first connection portion are arranged opposite to the second connection portion, the second latch portion and the second guide portion on basis of the support portion;

when the first latch portion and the second latch portion are in a relaxed state, the first latch portion and the second latch portion respectively have a tapered shape, a width of the support portion in a first direction perpendicular to the axial direction is greater than a maximum width of the first latch portion and a maximum width of the second latch portion in the first direction;

the first guide portion is connected with an end of the first latch portion and extends along the axial direction to be formed in a cylindrical shape, a width of the first guide portion in the first direction is smaller than a minimum width of the first latch portion in all directions perpendicular to the axial direction;

the second guide portion is connected with an end of the second latch portion and extends along the axial direction to be formed in a cylindrical shape, a width of the second guide portion in the first direction is smaller than a minimum width of the second latch portion in all directions perpendicular to the axial direction;

a width of the first connection portion in all directions perpendicular to the axial direction is smaller than the maximum width of the first latch portion; and a width of the second connection portion in all directions perpendicular to the axial direction is smaller than the maximum width of the second latch portion.

2. The cushioning member as claimed in claim 1, wherein the width of the first latch portion in the first direction gradually decreases in a direction from an end of the first latch portion connected with the first connection portion toward the first guide portion.

3. The cushioning member as claimed in claim 2, wherein the width of the second latch portion in the first direction gradually decreases in a direction from an end of the second latch portion connected with the second connection portion toward the second guide portion.

4. The cushioning member as claimed in claim 1, wherein the compressible material of the cushioning member comprises rubber or silicone.

5. A detachable device, comprising a first part, a second part, and at least one cushioning member, wherein:

the first part and the second part are detachably fixed together through the at least one cushioning member;

the at least one cushioning member comprises a support portion, a first latch portion, a second latch portion, a first connection portion, a second connection portion, a first guide portion and a second guide portion;

the first guide portion, the first latch portion, the first connection portion, the support portion, the second connection portion, the second latch portion, and the second guide portion are sequentially connected together along an axial direction;

the at least one cushioning member is a solid member made by compressible material, and the first guide portion, the first latch portion, and the first connection portion are arranged opposite to the second connection portion, the second latch portion and the second guide portion on basis of the support portion;

when the first latch portion and the second latch portion are in a relaxed state, the first latch portion and the second latch portion respectively have a tapered shape, a width of the support portion in a first direction perpendicular to the axial direction is greater than a maximum width of the first latch portion and a maximum width of the second latch portion in the first direction;

the first guide portion is connected with an end of the first latch portion and extends along the axial direction to be formed in a cylindrical shape, a width of the first guide portion in the first direction is smaller than a minimum width of the first latch portion in all directions perpendicular to the axial direction;

the second guide portion is connected with an end of the second latch portion and extends along the axial direction to be formed in a cylindrical shape, a width of the second guide portion in the first direction is smaller than a minimum width of the second latch portion in all directions perpendicular to the axial direction;

a width of the first connection portion in all directions perpendicular to the axial direction is smaller than the maximum width of the first latch portion; and a width of the second connection portion in all directions perpendicular to the axial direction is smaller than the maximum width of the second latch portion.

6. The detachable device as claimed in claim 5, wherein the first part comprises a first position-limiting channel, the second part comprises a second position-limiting channel, the first position-limiting channel corresponds to the second position-limiting channel along the axial direction, so that the first connection portion and the second connection portion of the cushioning member respectively penetrate through the first position-limiting channel and the second position-limiting channel, and the support portion of the cushioning member abuts between the first part and the second part.

7. The detachable device as claimed in claim 6, wherein when the first latch portion and the second latch portion are in the relaxed state, the maximum width of the first latch portion and the maximum width of the second latch portion are respectively greater than a width of the first position-limiting channel in the first direction perpendicular to the axial direction and a width of the second position-limiting channel in the first direction perpendicular to the axial direction, and when the first latch portion and the second latch portion are in a compressed state, the maximum width of the first latch portion in the first direction and the width of the second latch portion in the first direction are respectively less than or equal to the maximum width of the first position-limiting channel and the width of the second position-limiting channel.

8. The detachable device as claimed in claim 7, wherein the first part further comprises a first accommodating cavity, the second part further comprises a second accommodating cavity, the first accommodating cavity communicates with the first position-limiting channel in the axial direction to accommodate the first latch portion in the relaxed state, and the second accommodating cavity communicates with the second position-limiting channel in the axial direction to accommodate the second latch portion in the relaxed state.

9. The detachable device as claimed in claim 6, wherein a length of the first connection portion in the axial direction is greater than or equal to a thickness of the first position-limiting channel in the axial direction, and a length of the second connection portion in the axial direction is equal to a thickness of the second position-limiting channel in the axial direction.

10. The detachable device as claimed in claim 6, wherein the first part further comprises a first disassembly channel, the first position-limiting channel communicates with the first disassembly channel in a second direction perpendicular to the axial direction, a width of the first position-limiting channel is greater than a width of the first disassembly channel in the first direction, the second part further comprises a second disassembly channel, the second position-limiting channel communicates with the second disassembly channel in the second direction perpendicular to the axial direction, and a width of the second position-limiting channel is greater than a width of the second disassembly channel in the first direction.

11. The detachable device as claimed in claim 10, wherein when the first connection portion and the second connection portion are in the relaxed state, the width of the first connection portion in the first direction and the width of the second connection portion in the first direction are respectively greater than the width of the first disassembly channel and the width of the second disassembly channel, and when the first connection portion and the second connection portion are in a compressed state, the width of the first connection portion in the first direction and the width of the second connection portion in the first direction are respectively less than the width of the first disassembly channel and the width of the second disassembly channel.

12. The detachable device as claimed in claim 5, wherein the width of the first latch portion in the first direction gradually decreases in a direction from an end of the first latch portion connected with the first connection portion toward the first guide portion.

13. The detachable device as claimed in claim 12, wherein the width of the second latch portion in the first direction gradually decreases in a direction from an end of the second latch portion connected with the second connection portion toward the second guide portion.

14. The detachable device as claimed in claim 12, wherein the compressible material of the cushioning member comprises rubber or silicone.

15. The detachable device as claimed in claim 5, wherein by compressing the first latch portion and the second latch portion to insert into the first part and the second part in the axial direction respectively, the first part and the second part are assembled together, and by compressing the first connection portion and the second connection portion to moved out of the first part and the second part in a second direction perpendicular to the axial direction respectively, the first part and the second part are disassembled.

16. A cushioning member, configured to detachably fix a first part and a second part together, wherein the cushioning member comprising a support portion, a first latch portion, a second latch portion, a first connection portion, a second connection portion, a first guide portion, and a second guide portion, wherein:

the first guide portion, the first latch portion, the first connection portion, the support portion, the second connection portion, the second latch portion, and the second guide portion are sequentially connected together along an axial direction;

the cushioning member is a solid member made by compressible material, and the first guide portion, the first latch portion, and the first connection portion are arranged opposite to the second connection portion, the second latch portion and the second guide portion on basis of the support portion as a center, wherein the support portion has two surfaces respectively facing the first latch portion and the second latch portion, the two surfaces of the support portion respectively abut against the first part and the second part;

when the first latch portion and the second latch portion are in a relaxed state, a width of the support portion in a first direction perpendicular to the axial direction is greater than a width of the first latch portion and a width of the second latch portion in the first direction;

a width of the first guide portion in the first direction is smaller than the width of the first latch portion; and a width of the second guide portion in the first direction is smaller than the width of the second latch portion;

a width of the first connection portion in all directions perpendicular to the axial direction is smaller than a width of an end of the first latch portion connected with the first connection portion; and a width of the second connection portion in all directions perpendicular to the axial direction is smaller than a width of an end of the second latch portion connected with the second connection portion;

the first connecting portion and the second connecting portion are configured to be respectively located in a first position-limiting channel of the first part and a second position-limiting channel of the second part, a length of the first connection portion in the axial direction is greater than a thickness of the first position-limiting channel of the first part in the axial direction and a length of the second connection portion in the axial direction is equal to a thickness of the second position-limiting channel of the second part in the axial direction.

17. A detachable device, comprising a first part, a second part, and at least one cushioning member, wherein:

the first part and the second part are detachably fixed together through the at least one cushioning member, the first part comprises a first position-limiting channel and the second part comprises a second position-limiting channel;

the at least one cushioning member comprises a support portion, a first latch portion, a second latch portion, a first connection portion, a second connection portion, a first guide portion and a second guide portion;

the first guide portion, the first latch portion, the first connection portion, the support portion, the second connection portion, the second latch portion, and the second guide portion are sequentially connected together along an axial direction;

the at least one cushioning member is a solid member made by compressible material, and the first guide portion, the first latch portion, and the first connection portion are arranged opposite to the second connection portion, the second latch portion and the second guide portion on basis of the support portion as a center, wherein the support portion has two surfaces respectively facing the first latch portion and the second latch portion, the two surfaces of the support portion respectively abut against the first part and the second part;

when the first latch portion and the second latch portion are in a relaxed state, a width of the support portion in a first direction perpendicular to the axial direction is greater than a width of the first latch portion and a width of the second latch portion in the first direction;

a width of the first guide portion in the first direction is smaller than the width of the first latch portion; and a width of the second guide portion in the first direction is smaller than the width of the second latch portion;

a width of the first connection portion in all directions perpendicular to the axial direction is smaller than a width of an end of the first latch portion connected with the first connection portion; and a width of the second connection portion in all directions perpendicular to the axial direction is smaller than a width of an end of the second latch portion connected with the second connection portion;

the first connecting portion and the second connecting portion are configured to be respectively located in a first position-limiting channel of the first part and a second position-limiting channel of the second part, a length of the first connection portion in the axial direction is greater than a thickness of the first position-limiting channel of the first part in the axial direction and a length of the second connection portion in the axial direction is equal to a thickness of the second position-limiting channel of the second part in the axial direction.

* * * * *